Aug. 7, 1962 E. SCHASCHL 3,048,777
APPARATUS FOR MEASURING THE RATE OF ACCUMULATION
OF STATIC ELECTRICAL POTENTIAL
Filed Sept. 10, 1959

INVENTOR.
EDWARD SCHASCHL
BY Edward H. Lang
ATTORNEY

3,048,777
APPARATUS FOR MEASURING THE RATE OF ACCUMULATION OF STATIC ELECTRICAL POTENTIAL
Edward Schaschl, Crystal Lake, Ill., assignor to The Pure Oil Company, Chicago, Ill., a corporation of Ohio
Filed Sept. 10, 1959, Ser. No. 839,226
3 Claims. (Cl. 324—72)

This invention is directed to an apparatus for measuring the rate of accumulation of static electrical potential.

It is known that many liquids, and especially inflammable hydrocarbons, build up great charges of static electricity. Electrical potential is generated by friction between moving liquid layers, and where the liquid is a very poor conductor of electricity, static charges of great magnitude accumulate. Such charges are eventually dissipated by electric arc to the side of the container, or to other grounded structures.

It is known that electric sparks produced by static electricity present a great fire hazard. Where the liquid being stored is an inflammable hydrocarbon, the probability that an electric spark will produce a fire is very great. The art teaches the use of certain additives to increase the conductivity of hydrocarbons, and thereby decrease the rate of build-up of static potential. Since such additives are expensive, and act as impurities in the hydrocarbon to which they have been added, it is desirable that they may be used in the smallest quantities which will provide adequate protection against fire.

It is the object of this invention to provide an apparatus for measuring the rate of accumulation of static electricity. It is a further object of this invention to provide such an apparatus which has the further advantage of being simple, portable, compact, and inexpensive. It is another object of this invention to provide an apparatus for determining whether the rate of accumulation of static electricity in a hydrocarbon storage container is such as will produce a fire hazard.

Briefly, the apparatus of this invention comprises an electroscope, an electrical conductor for connecting the input terminal of the electroscope to the point at which the accumulation of static electricity is to be sensed, an electrode extending within the electroscope and adapted to be contacted by one of the leaves of the electroscope when it is extended under the influence of a static charge, a second conductor connecting the second electrode to ground, and means cooperating with said electroscope or ground rod to count the number of, or interval between, the discharges of said electroscope.

This invention is best described with reference to the drawing, of which:

Figure 1:
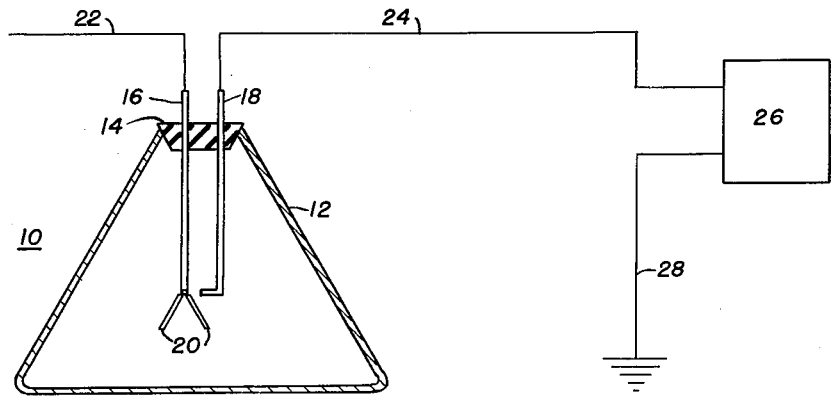
FIGURE 1 is a view, partially schematic, of the apparatus of this invention.

Referring to FIGURE 1, electroscope 10 includes vessel 12, which is equipped with sealed top 14. Electrodes 16 and 18 extend through top 14 in sealed relation therewith and derive support therefrom. The vessel is preferably airtight, so that a vacuum may be maintained therein. Two thin metallic plates 20, which are preferably made of gold, are secured to the lower extremity of electrode 16. These plates or leaves may be made thin enough so that they are flexible and normally extend vertically downward from electrode 16 under the force of gravity. Alternatively, the plates may be thicker and more rigid, in which case they will be pivotably supported from electrode 16. Conductor 22 is electrically connected to electrode 16 and communicates with any source of static electricity to be studied. Conductor 22 may terminate in a probe-type electrode adapted to be suspended, for example, in a hydrocarbon storage container. Conductor 24 electrically connects electrode 18 with counter 26. Counter 26 is connected to ground through conductor 28.

The principle of the electroscope is old and well known. Static electricity sensed by conductor 22 is communicated through electrode 16 to metallic plates 20. The presence of static electricity upon plates 20 causes the plates to spread away from each other and rotate upward against the force of gravity. The distance through which the plates deflect is proportional to the magnitude of the applied static potential. As static electricity accumulates, the plates deflect further and further apart until the right-hand plate contacts discharge electrode 18. At the instant of contact, the accumulated static potential is discharged through the electrode 18, conductor 24, counter 26, and conductor 28 to ground. With the static charge thus removed, plates 20 drop to their initial position and as static electricity again accumulates, the cycle is repeated. Counter 26 is preferably a pulse counter which measures the number of discharges occurring in a period of time. Many such pulse counters are known to the art and are commercially available. Alternatively, counter 26 may be adapted to measure and record the interval between individual discharges of the electroscope. Such counters are also known to the art and commercially available.

Figure 2:
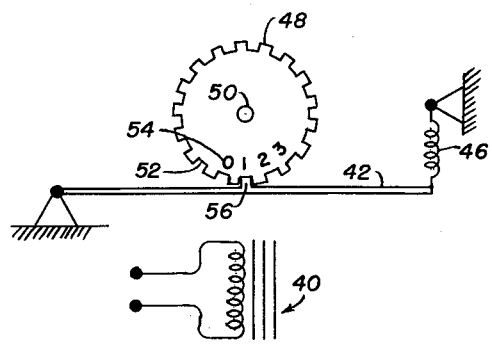
FIGURE 2 is a schematic drawing of a pulse counter which may be used as an element of the apparatus of this invention.

A specific example of a simple pulse counter is set out in FIGURE 2. The counter includes electromagnet 40 and metallic armature 42, which is pivotably supported and adapted to be drawn toward electromagnet 40 when the electromagnet is energized. Spring 46 urges armature 42 upward, away from electromagnet 40. Disc 48 is pivotably mounted on axle 50. The periphery of disc 48 is notched with a plurality of notches 52, the disc is driven in a clockwise direction by some torque-producing means, such as a spring motor, not shown in the figure. A numeral 54 is placed adjacent to each notch in the periphery of the disc. Tip 56, on the upper surface of armature 42, engages notches 52 to prevent the rotation of the disc when the armature is held in the upward position by spring 46. Discharge of electroscope 10 through electrode 18 energizes electromagnet 40 and moves armature 42 downward so that tip 56 is disengaged from notches 52 of the disc. The discharge of the electroscope is almost instantaneous, thus the movement of the armature is small and spring 46 quickly returns the armature in an upward direction. During the interval of disengagement, the periphery of the disc rotates a sufficient distance to block reentry of tip 56 into the notch indicated by numeral 1. Tip 56 rides against the outer periphery of the disc as the disc rotates until the notch indicated by numeral 2 is opposite the tip. At this point, tip 56 enters notch 2 and prevents further rotation of the disc. Thus, the elements of FIGURE 2 co-operate to produce an escapement type counter.

Numerous electroscope designs are well known in the art. The double, movable leaf-type electroscope is shown in FIGURE 1. Barton, U.S. Patent No. 1,815,606, discloses an electroscope which utilizes a single, pivotably-supported, movable vane and a rigid, substantially-inflexible, surface-type vane. Thus, only one of the vanes is movable. Johnson, U.S. Patent No. 1,446,748, discloses a second electroscope type which may include either one or two movable vanes. The movement of the vanes is counterbalanced by the tension in an external spring, or by flexural stresses induced in the vanes themselves. Thus, the action of the electroscope of Johnson is not dependent upon the force of gravity, and the electroscope need not be maintained in a vertical position. These and other electroscopes known to the art may be adapted for the purpose of this invention by providing a cooperating discharge electrode, such as electrode 18 shown in FIGURE 1. It is evident that various modifications may be made in the electroscope or pulse counter used in the apparatus of this invention without departing from the spirit and scope of the invention. In some instances, it may be desirable to eliminate pulse counter 26 altogether and time the interval between discharges of the electroscope by non-automatic means, such as a stopwatch. It is preferred, however, to use an automatic pulse counter such as is shown in FIGURE 2. Counters which indicate the time interval between pulses, rather than the number of pulses per interval of time, may be used if desired. Obviously, the shorter the interval between discharges of the electroscope, the more rapid is the build-up of static electricity at the zone contacted by the input conductor.

The embodiments of the invention in which an exclusive property or privilege is claimed are defined as follows:

1. An apparatus for measuring the rate of accumulation of static electricity comprising an electroscope including a first electrode, a thin, movable, metallic plate depending therefrom and adapted for movement under the influence of a static potential applied only to said electrode; a second electrode supported adjacent to said plate and adapted to be contacted by said plate when it moves under the influence of an applied potential, a first conductor means for connecting said first electrode to a source of static potential under study, and a second conductor means for connecting said second electrode to ground and including pulse-counting means responsive to the electrostatic discharge when said plate contacts said second electrode.

2. An apparatus according to claim 1 in which said electroscope includes an evacuated vessel enclosing said plate and the portion of the second electrode contactable by said plate.

3. An apparatus according to claim 2 in which said pulse-counting means comprises an electromagnet, a spring-loaded armature cooperating with said electromagnet, a rotatably supported, peripherally-notched disc cooperating with said armature to form an escapement, said armature including a projecting tip adapted to engage the notches of said disc to impede rotation thereof when said armature is not drawn toward said electromagnet, and to release said disc for rotation when said armature is drawn toward said electromagnet, and means for applying rotative torque to said rotatively mounted disc.

References Cited in the file of this patent
UNITED STATES PATENTS

| | | |
|---|---|---|
| 657,221 | Kitsee | Sept. 4, 1900 |
| 685,958 | Tesla | Nov. 5, 1901 |
| 888,241 | Kuhlmann | May 19, 1908 |
| 1,446,748 | Johnsen et al. | Feb. 27, 1923 |
| 1,605,911 | Banneitz | Nov. 9, 1926 |
| 1,922,933 | Dirks | Aug. 15, 1933 |
| 2,315,805 | Mayo et al. | Apr. 6, 1943 |

FOREIGN PATENTS

| | | |
|---|---|---|
| 534,952 | France | Jan. 16, 1922 |